United States Patent
Ruess et al.

(10) Patent No.: US 8,540,203 B2
(45) Date of Patent: Sep. 24, 2013

(54) LONGITUDINAL ADJUSTER FOR A VEHICLE SEAT WITH SPINDLE AND SPINDLE HOLDER

(75) Inventors: Georg Ruess, Oberarnbach (DE); Jürgen Krebs, Rockenhausen (DE); Heinrich Hammann, Teschenmoschel (DE); Thomas Dill, Heiligenmoschel (DE); Ulf Schäffling, Kaiserslautern (DE); Andreas Rüth, Kaiserslautern (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 94 days.

(21) Appl. No.: 12/968,395

(22) Filed: Dec. 15, 2010

(65) Prior Publication Data

US 2011/0139954 A1 Jun. 16, 2011

(30) Foreign Application Priority Data

Dec. 16, 2009 (DE) .......................... 10 2009 058 450
Mar. 4, 2010 (DE) .......................... 10 2010 010 585

(51) Int. Cl.
*F16M 13/00* (2006.01)

(52) U.S. Cl.
USPC ........... 248/429; 248/432; 248/421; 297/330; 296/65.13

(58) Field of Classification Search
USPC .................. 248/429, 424, 430, 432, 421; 296/65.13–65.15; 411/111, 113; 74/89.33; 297/330, 311, 388.11, 344.1, 344.2, 344.17, 297/344.11
See application file for complete search history.

(56) References Cited

U.S. PATENT DOCUMENTS

| | | | | |
|---|---|---|---|---|
| 4,802,374 A * | 2/1989 | Hamelin et al. | ............. | 74/89.14 |
| 4,907,776 A * | 3/1990 | Nemoto | ........................ | 248/430 |
| 6,086,154 A * | 7/2000 | Mathey et al. | ................ | 297/341 |
| 6,220,642 B1 * | 4/2001 | Ito et al. | ..................... | 296/65.14 |
| 6,244,660 B1 * | 6/2001 | Yoshimatsu | ............... | 297/344.1 |
| 6,260,922 B1 * | 7/2001 | Frohnhaus et al. | ........... | 297/330 |
| 6,273,507 B1 * | 8/2001 | Downey | ................... | 297/344.15 |
| 6,290,199 B1 * | 9/2001 | Garrido et al. | ................ | 248/424 |
| 6,688,574 B2 * | 2/2004 | Okazaki et al. | ............... | 248/424 |
| 6,688,667 B2 * | 2/2004 | Nishimoto et al. | ........ | 296/65.15 |
| 7,048,244 B2 * | 5/2006 | Hauck | ........................... | 248/430 |
| 7,198,243 B2 * | 4/2007 | Hofschulte et al. | ........... | 248/429 |
| 7,252,278 B2 * | 8/2007 | Garrido | ........................ | 248/424 |
| 7,303,223 B2 * | 12/2007 | Nakamura et al. | ......... | 296/65.15 |

(Continued)

FOREIGN PATENT DOCUMENTS

DE 10003305 C1 6/2001
DE 102005012018 A1 9/2006

(Continued)

*Primary Examiner* — Terrell McKinnon
*Assistant Examiner* — Monica Millner
(74) *Attorney, Agent, or Firm* — McGlew and Tuttle, P.C.

(57) ABSTRACT

A longitudinal adjuster for a vehicle seat (1) with a spindle (13), which is arranged in a hollow space formed by a pair of rails (5, 7), and with spindle holders (15). The area of connection of at least one of the spindle holders (15a) to one of the rails (5) lies outside of the hollow space formed by the rails (5, 7). The spindle holder (15a) extends with a partial area, with which it is connected to an end (13a) of the spindle (13), into the hollow space.

24 Claims, 7 Drawing Sheets

(56) References Cited

U.S. PATENT DOCUMENTS

| | | | |
|---|---|---|---|
| 7,325,851 B2 * | 2/2008 | Ito et al. ................... | 296/65.13 |
| 7,556,234 B2 * | 7/2009 | Ito et al. ................... | 248/429 |
| 7,597,303 B2 * | 10/2009 | Kimura et al. ............. | 248/429 |
| 7,661,647 B2 * | 2/2010 | Ito ............................ | 248/429 |
| 7,669,824 B2 * | 3/2010 | Woehrle et al. ............ | 248/429 |
| 8,226,063 B2 * | 7/2012 | Weber ........................ | 248/429 |
| 2006/0249644 A1 * | 11/2006 | Folliot et al. .............. | 248/429 |
| 2006/0278037 A1 * | 12/2006 | Borbe et al. ............... | 74/640 |
| 2007/0152485 A1 * | 7/2007 | Ehrhardt .................... | 297/344.1 |
| 2010/0320352 A1 * | 12/2010 | Weber ........................ | 248/429 |

FOREIGN PATENT DOCUMENTS

| | | |
|---|---|---|
| DE | 102006022947 | 9/2007 |
| DE | 202006012434 U1 | 1/2008 |
| DE | 202009002972 U1 | 7/2009 |

\* cited by examiner

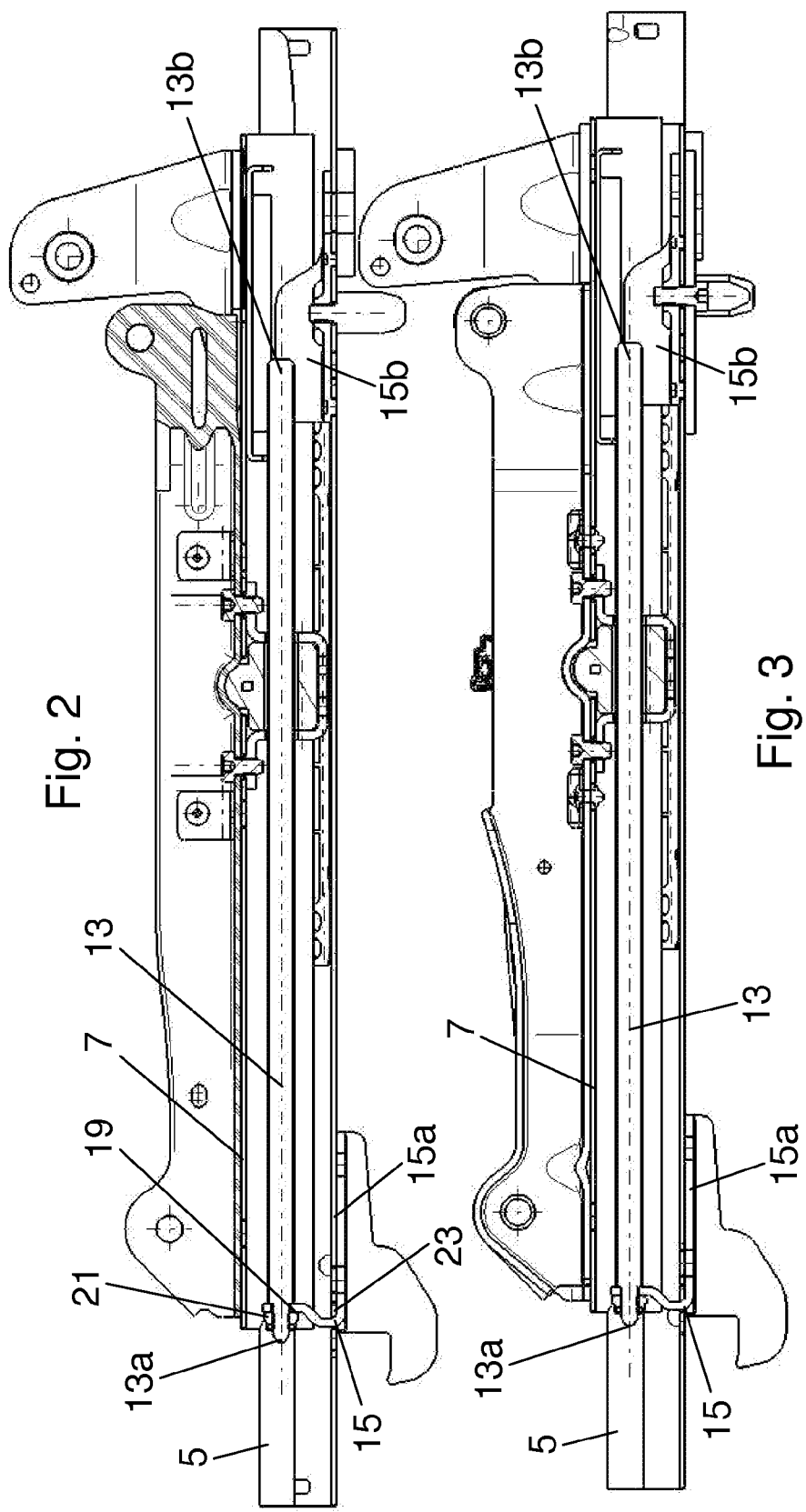

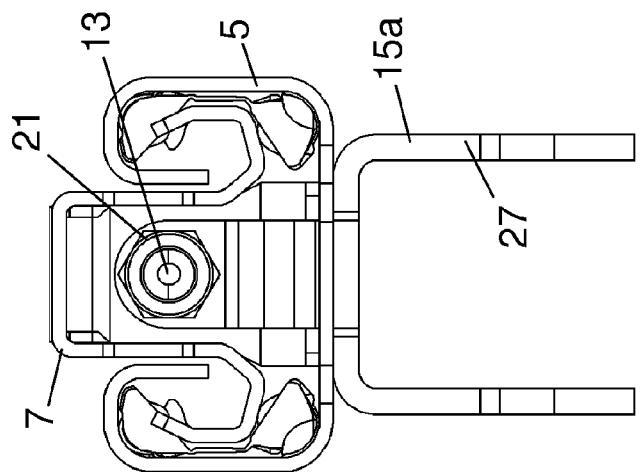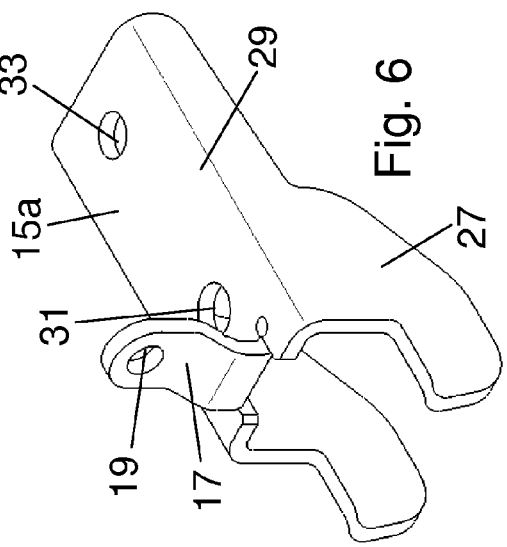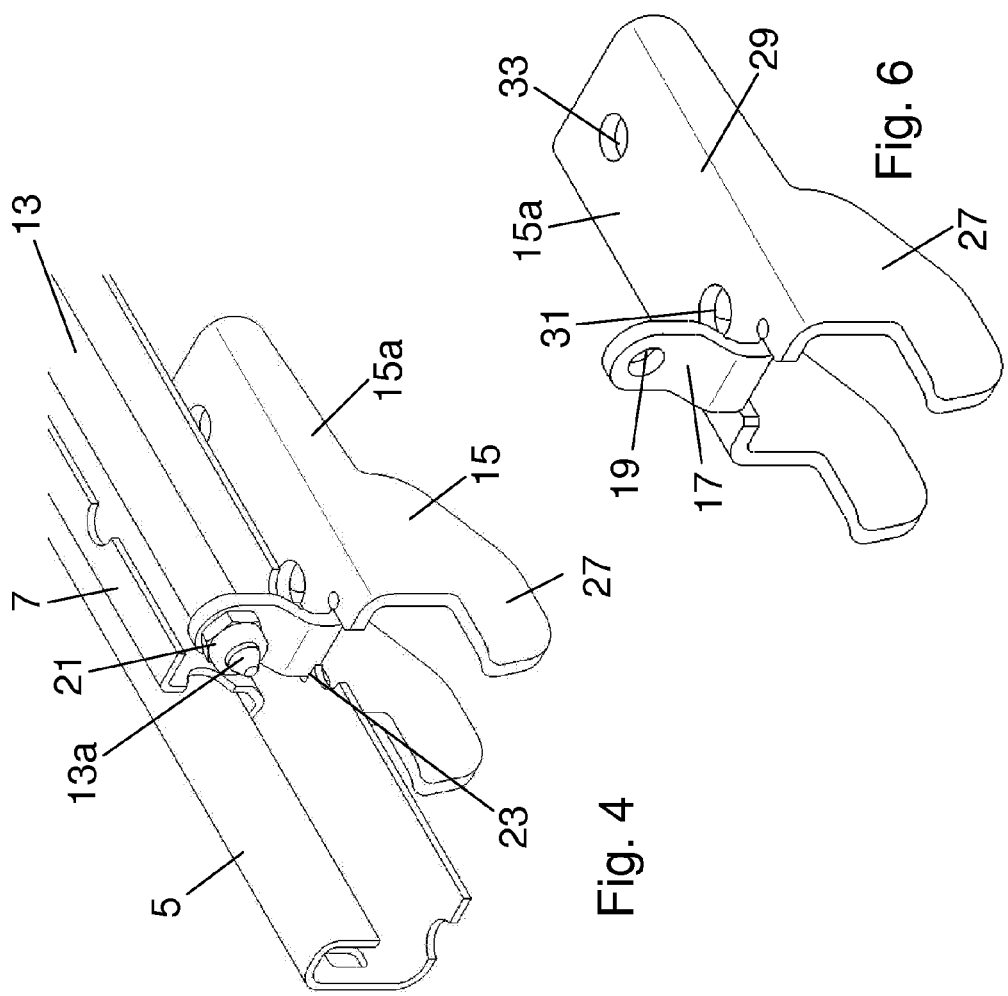

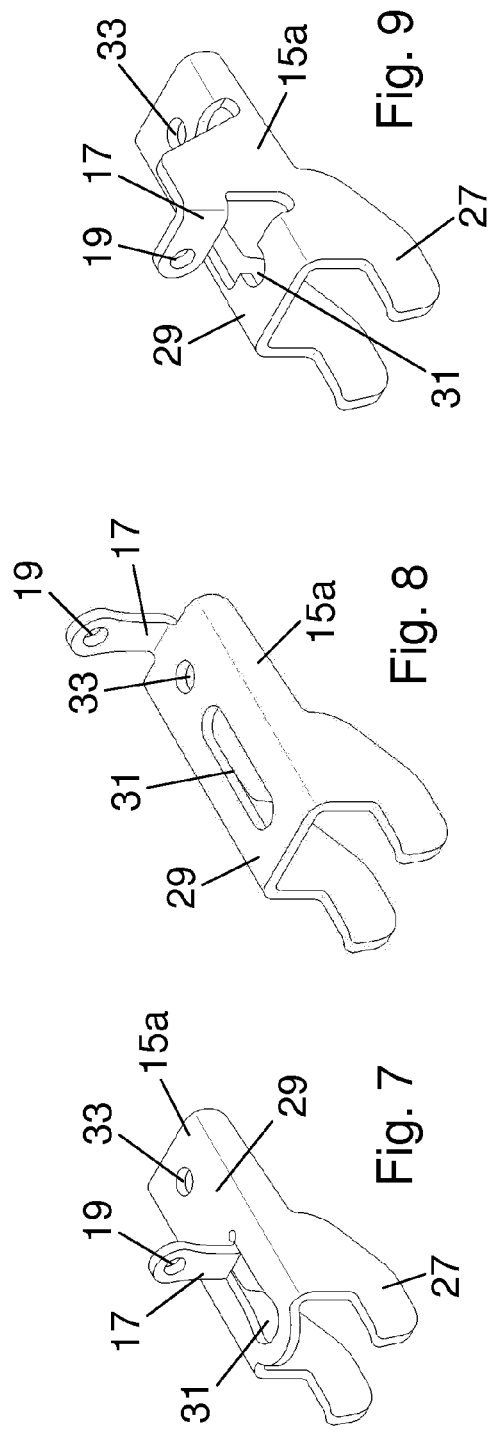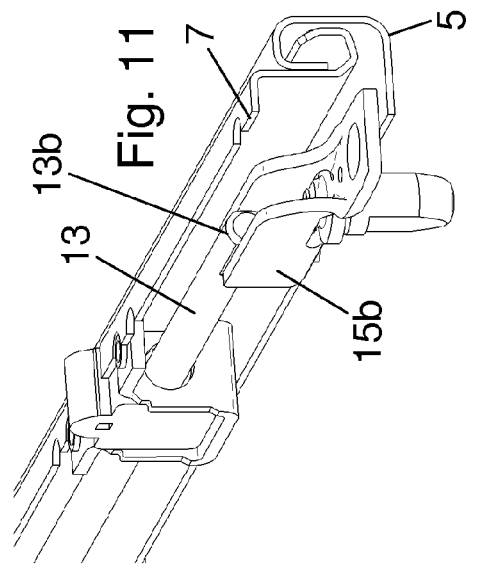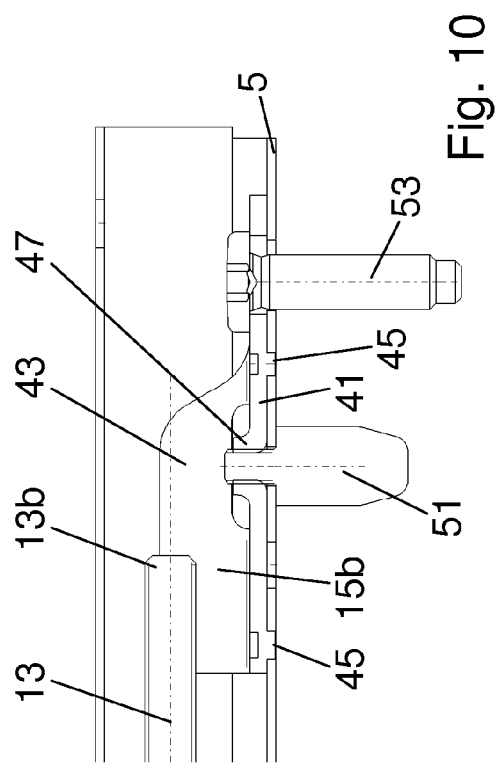

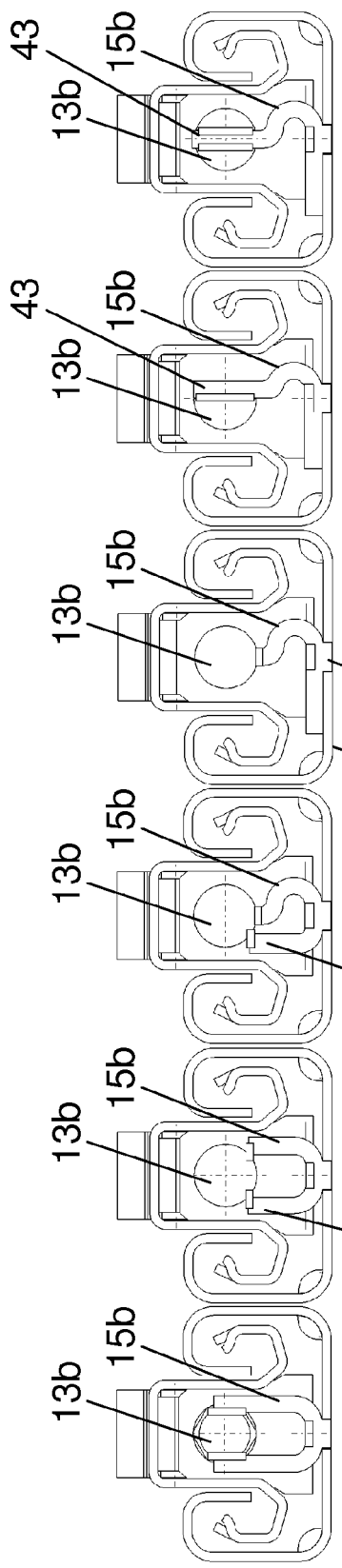
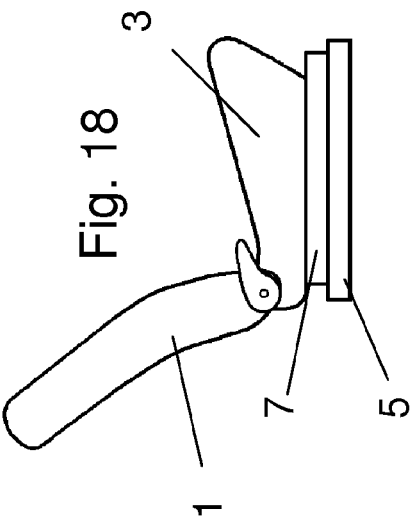

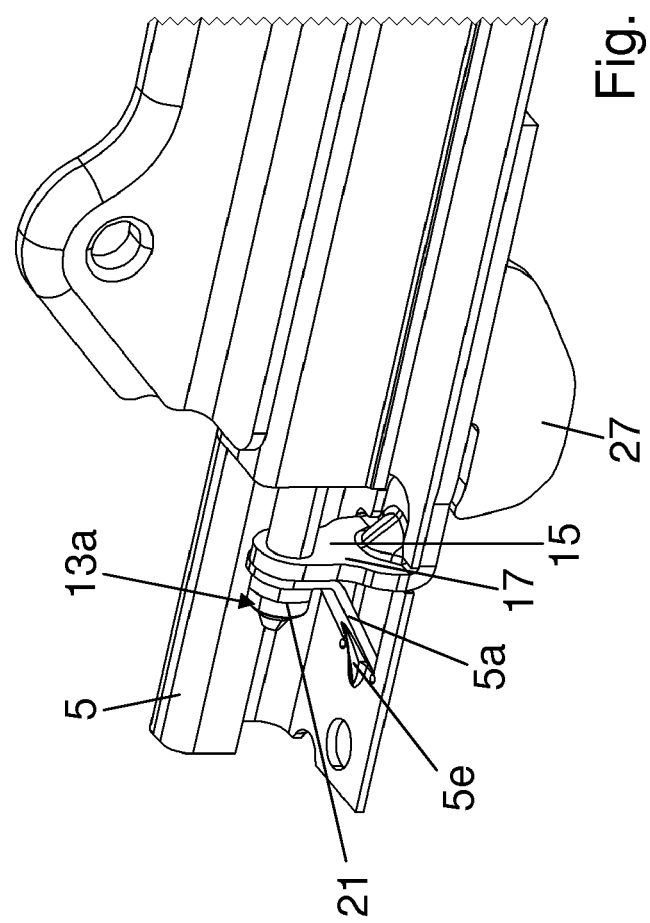

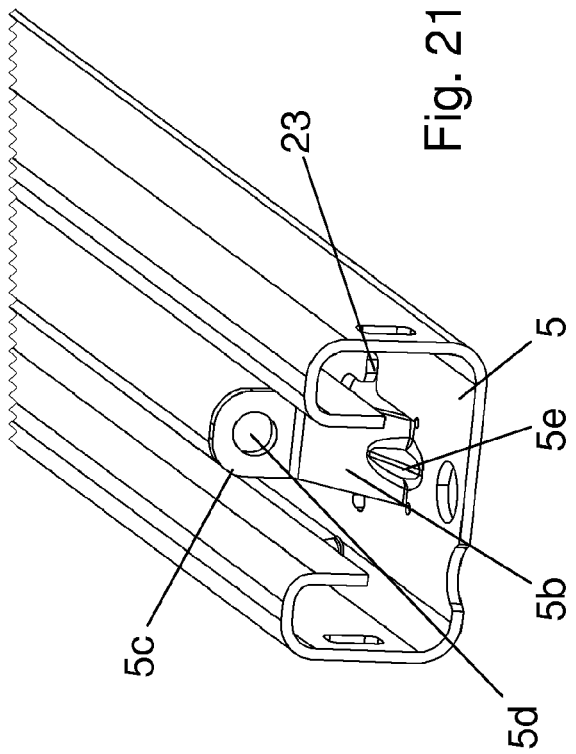
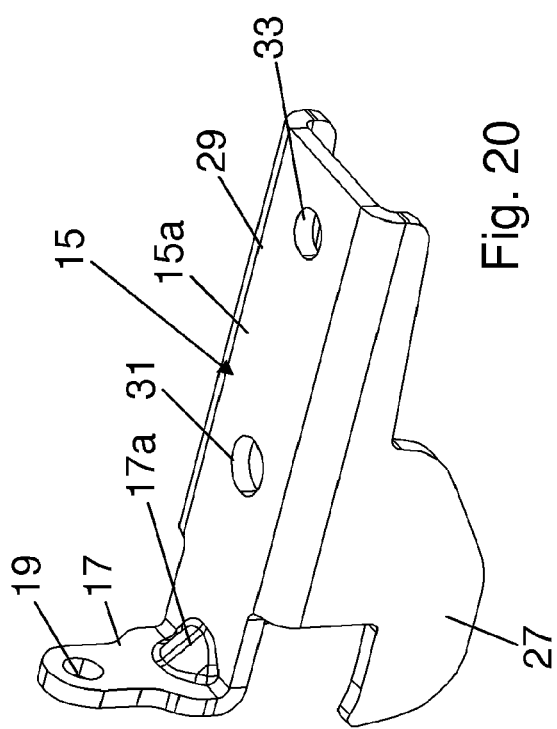

LONGITUDINAL ADJUSTER FOR A VEHICLE SEAT WITH SPINDLE AND SPINDLE HOLDER

CROSS REFERENCE TO RELATED APPLICATIONS

This application claims the benefit of priority under 35 U.S.C. §119 of German Patent Application DE 10 2009 058 450.1 filed Dec. 16, 2009 and German Patent Application DE 10 10 2010 010 585.6 filed Mar. 4, 2010, the entire contents of which are incorporated herein by reference.

FIELD OF THE INVENTION

The present invention pertains to a longitudinal adjuster with spindle and spindle holder for a vehicle seat with the spindle arranged in a hollow space formed by a pair of rails.

BACKGROUND OF THE INVENTION

DE 10 2006 022 947 B3 discloses a longitudinal adjuster for a vehicle seat, and especially a motor vehicle seat, with a gear mechanism, mounting elements supporting the gear mechanism, at least a first seat rail and at least a second seat rail, which together form a rail profile, within which the gear mechanism is at least largely arranged, and which are movable in the lengthwise direction in relation to one another driven by the gear mechanism, whereby the gear mechanism has a spindle, a housing, a first spindle nut accommodated by the housing, a worm connected to the first spindle nut by gearing, accommodated by the housing, drivable by means of a motor, and a housing holder supporting the housing and connected to the second seat rail. Furthermore, two spindle holders are provided, with which the fixed spindle is rigidly connected, and especially welded. The spindle holders are connected to the first rail and/or together with this first rail to the vehicle structure.

A rail adjustment system with spindle and spindle mount has become known from DE 20 2006 012 434 U1, with a spindle, a lower rail fixed to the vehicle, an upper rail which is displaceable in a direction of displacement, a bearing bracket fastened to the upper rail and a mounting element for the rotatable mounting of the spindle, whereby the mounting element is designed in such a way that it is displaceable in relation to the bearing bracket in a plane essentially at right angles to the direction of displacement. Hereby, the bearing bracket for the spindle, formed by a sheet metal bent component, is arranged from the inside on the rail and protrudes in the direction of the space between the two rails.

SUMMARY OF THE INVENTION

The object of the present invention is to improve a longitudinal adjuster of the type mentioned in the introduction.

According to the invention, a longitudinal adjuster is provided for a vehicle seat. The longitudinal adjuster for a vehicle seat is provided with a spindle arranged in a hollow space formed by a pair of rails and spindle holders has at least one spindle holder, which is arranged from the outside on one of the rails and extends into the hollow space with a partial area, with which it is connected to one end of the spindle. Spindle holders and rails are preferably connected by means of welding, but may also be connected in other ways.

The spindle holder preferably has a bracket, with which it protrudes into the hollow space and on which the spindle is arranged. Hereby, a lead-through opening for the end of the spindle, through which the tapered end of the spindle is guided and fixed, for example by means a screwed-on nut, may be provided in the bracket.

One of the spindle holders, especially preferably the spindle holder arranged in the forward travel direction, is especially preferably arranged on the rail from the outside, and the other spindle holder, especially the one arranged against the direction of travel, is arranged on the rail from the inside.

The spindle holder arranged from the outside preferably has at least one area extending outwardly away from the rail, which has a hook-like partial area. With this hook-like partial area, it can be used for attaching to the vehicle structure, especially extend behind an area of the vehicle structure so that an especially simple fastening of the rail and thus of the entire longitudinal adjuster to the vehicle structure is made possible. A counter-fixing is possible, for example, by means of bolts screwed through the rails from above at the opposite end of the rails.

The spindle holder can be manufactured in an especially simple manner in that it is designed as a sheet metal bent component, which has at least one bent-down area and one bent-up bracket. The sheet metal bent component especially preferably has a middle area, from which the bracket is punched out and is bent up. Hereby, the opening formed by the bending out of the bracket can be used for a fastening of the holder to the rail. A corresponding part does not, however, have to be produced by means of punching and bending from a sheet metal, but may also be produced in any other way. Materials other than metals may especially also be used for this holder.

The longitudinal adjuster is preferably fastened to a vehicle structure in such a way that the one spindle holder has at least one, and especially two areas, arranged in parallel to one another and extending outwardly away from the rail, which have each a hook-like partial area, which cooperates with an undercut area of the vehicle structure, in order to hold the rail on the vehicle structure.

The longitudinal adjuster especially preferably has at least one spindle holder with a bent-up bracket protruding into the hollow space and another bent-up bracket protruding into the hollow space, whereby the brackets have openings aligned with one another, through which the end of the spindle is guided. By providing the additional support of the spindle holder by another bracket, better properties are achieved in case of a crash. If the bracket is connected to the front spindle holder, especially improved properties are achieved in relation to the tensile loads occurring in rear-end collisions.

The other bracket especially preferably has a first area running at an acute angle to the rail and a second end area running at right angles to the lengthwise extension of the rail. Hereby, the first area runs especially preferably at an angle of 45°±25° to the lengthwise direction of the rail. By providing a diagonally running area, the strength of the bracket, especially with regard to tensile loads, is increased.

The other bracket is preferably embodied in one piece with the rail, but may also be arranged on the rail in any way, especially preferably welded.

The present invention is described in detail below based on a plurality of exemplary embodiments shown in the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is a sectional view through the tunnel-side rail of FIG. 1;

FIG. 3 is a sectional view through the sill-side rail of FIG. 1;

FIG. 4 is a perspective, elevated view of the arrangement of a front spindle holder on a pair of rails according to FIG. 1;

FIG. 5 is a front view of a rail with spindle holder;

FIG. 6 is a perspective view of the front spindle holder of FIG. 4;

FIG. 7 is a perspective view of a front spindle holder according to the second exemplary embodiment;

FIG. 8 is a perspective view of a front spindle holder according to the third exemplary embodiment;

FIG. 9 is a perspective view of a front spindle holder according to the fourth exemplary embodiment;

FIG. 10 is a cutout sectional view of the tunnel-side, rear spindle holder according to FIG. 2;

FIG. 11 is a perspective, elevated view of the pair of rails with spindle holder of FIG. 10;

FIG. 12 is a view of the arrangement of FIG. 11 from behind;

FIG. 13 is a view of a first variant of a rear spindle holder corresponding to FIG. 12;

FIG. 14 is a view of a second variant of a rear spindle holder corresponding to FIG. 12;

FIG. 15 is a view of a third variant of a rear spindle holder corresponding to FIG. 12;

FIG. 16 is a view of a fourth variant of rear spindle holder corresponding to FIG. 12;

FIG. 17 is a view of a fifth variant of a rear spindle holder corresponding to FIG. 12;

FIG. 18 is a schematic view of a vehicle seat;

FIG. 19 is a partly elevated, perspective view of a rail with a spindle holder according to an another exemplary embodiment;

FIG. 20 is a perspective view of a holder, as it is arranged on the rail of FIG. 19; and FIG. 21 is a perspective view of the end area of the rail of FIG. 19.

DESCRIPTION OF THE PREFERRED EMBODIMENTS

Figure 1:
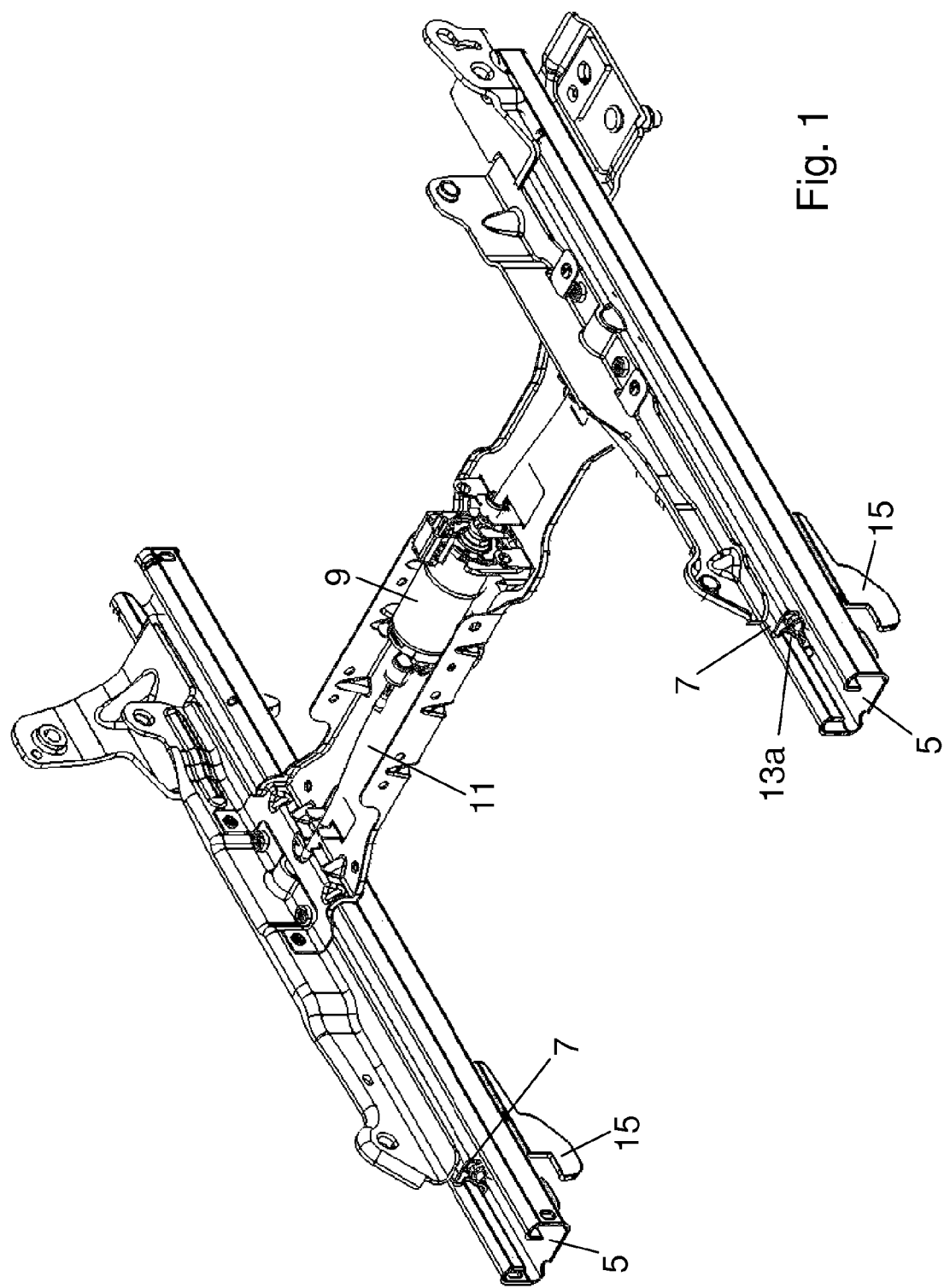
FIG. 1 is a perspective view of a longitudinal adjuster with two front spindle holders in accordance with the first exemplary embodiment.

Referring to the drawings in particular, a vehicle seat 1 for a motor vehicle has a seat part 3 and a backrest adjustable in its inclination in relation to the seat part 3 and pivotable forwards in the direction of the seat part 3. Two first rails 5, fixed to the vehicle and running in parallel to one another, and second rails 7 mounted fixed to the seat guided by means of same first rails are provided for the longitudinally displaceable and adjustable mounting of the vehicle seat 1 in the vehicle. Hereby, in the vehicle the one pair of rails 5, 7 is arranged on the tunnel side and the other pair of rails 5, 7 is arranged on the sill side. The normal vehicle direction of the vehicle defines the direction data used below. The vehicle seat 1 is connected to the second rails 7, for which corresponding adapters are arranged on the second rails 7 in the present case.

The vehicle seat 1 can be longitudinally adjusted by an electric motor in a manner known per se, for which an electric motor 9 is positioned on a traverse 11 connected to the two second rails 7 mounted fixed to the seat. Via a gear connection known per se, the shaft of the electric motor 9 is connected via a spindle nut to two spindles 13 arranged in the hollow space formed by each of the pairs of rails 5, 7. The spindles 13 are arranged fixed in this hollow space, for which they are held at their ends by spindle holders 15, which are in turn rigidly connected to the respective first rail 5, which is fixed to the vehicle structure, and partly also directly in a positive-locking manner to the vehicle structure. Below, the front end is provided with the reference number 13a and the rear end with the reference number 13b. Correspondingly, the front holder is designated with the reference number 15a and the rear holder with the reference number 15b.

The front holder 15a according to the first exemplary embodiment is dealt with in detail below. In the present case, the front holder 15a is formed by a sheet metal bent component, which, besides the function as holder, also has a holding function in relation to the vehicle structure. The sheet metal bent component is manufactured by means of punching and bending from a sheet metal of constant thickness. In principle, however, other materials and/or ways of manufacturing are also possible. For example, the part may also be injection-molded from fiber-reinforced plastic.

For holding the front end 13a of the spindle 13, the front holder 15a has, on its front end, a bent-up bracket 17, which is provided in its end area, having a round design, centrally with a lead-through opening 19 for the end of the spindle 13. The front end 13a of the spindle 13, which is embodied with a somewhat tapered design and is provided with an outer thread, is guided through this lead-through opening 19 and held in the front holder 15a by means of a nut 21 screwed on from the end and tightened.

The sheet metal part, which forms the front holder 15a, still has, besides the bent-up bracket 17, two bent-down areas 27 arranged in a mirror-inverted manner in relation to the central longitudinal axis of the sheet metal part, between which bent-down areas a middle area 29 is arranged, which—as mentioned further above—is arranged from below on the underside of the first rail 5. In this case, the lower, front ends of the bent-down areas 27 protrude further than the middle area 29 and especially also the upper area of the bent-down areas 27, so that overall a hook-like shape of the bent-down areas 27 is produced.

The bracket 17 of the front holder 15a is guided from below through a slot 23 in the first rail 5 that is fixed to the vehicle structure, i.e., the holder-rail connection area lies outside the hollow space formed by the pair of rails 5, 7. In the middle area 29 of the holder 15, two openings 31, 33 are embodied in the shape of circular openings (punched-out openings or holes). In the present case, the holder 15 and the rail 5 are connected by means of welding, but may also be connected in any other way. The above-mentioned openings 31, 33 may be used, for example, for exact positioning of the holder on the rails for welding.

With the projecting, hook-like areas of the bent-down areas 27, a correspondingly embodied area of the vehicle structure can be grasped from behind, so that the front holders 15a are part of the fixing of the first rails 5 to the vehicle structure.

Other exemplary embodiments of front holders 15a are described in detail below with reference to FIGS. 7 through 9. The same reference numbers as in the first exemplary embodiment are used here for identical or identical-acting components. Furthermore, a description of the bent-down areas 27 together with their hook-like, projecting area is omitted, since same are embodied in all cases corresponding to the first exemplary embodiment and serve the same purpose.

In contrast to the first exemplary embodiment, the bracket 17 with its lead-through opening 19 according to the second exemplary embodiment is directly punched out of the middle area 29 and bent up. Mounting on the first rail 5 takes place corresponding to the first holder 15a according to the first exemplary embodiment. The opening 31 formed by punching out and bending out the bracket 17 in the shape of an elongated hole in the middle area 29 may be used for mounting the front holder 15a on the first rail 5, as the second opening 33 embodied in the shape of a circular opening (or hole). The entire embodiment of this holder 15 is, in the present case, in turn mirror inverted with regard to its central longitudinal axis.

According to the third exemplary embodiment of a front holder 15a, the bracket 17 with its lead-through opening 19 is, compared to the first exemplary embodiment, arranged on the opposite end of the middle area 29. Furthermore, two openings 31, 33 are provided in the middle area 29, whereby one of the openings is embodied as an elongated hole and the other opening is embodied as a circular opening.

According to the fourth exemplary embodiment, the bracket 17 with its lead-through opening 19 is in turn formed as a part of the middle area 29, which is punched out and bent up. In this case, however, a partial area of the bracket 17 runs in the same plane as one of the bent-down areas 27 and is embodied with an arm 17a, which is bent over by 90°, so that the alignment of the lead-through opening 19 is again corresponding to the above-described exemplary embodiments. Another circular opening 33 is provided in the middle area 29 besides the opening 31 formed by punching out and bending up the bracket 17.

The rear holder 15b according to the first exemplary embodiment is dealt with in detail below. In contrast to the front holder 15a, the rear holder 15b is arranged in the hollow space, which is formed by the rails 5, 7, i.e., it is mounted on the first rail 5 from above.

The rear holder 15b is embodied as a sheet metal bent component, whereby it has a middle area 41 with two lateral areas 43 bent up by 90°. The entire rear holder 15b is embodied as mirror inverted to its central longitudinal axis. In the middle area 41 are embodied two down-protruding beads 45, a standing-up passage 47 with an inner thread and an opening 49. The two beads 45 are used for the positioning in the first rail, in which corresponding openings are embodied, in which the beads 45 are positioned. In the present case, the rear holder 15b is (pre)fastened to the rail 5 by means of a bolt 51, which is guided from below by an opening embodied in the rail 5 and lies with its head area on the rail 5. In the present case, the bolt 51 is provided with a head area which is embodied as a positioning pin, so that it is used, at the same time, for the positioning of the first rail 5 on the vehicle structure. In the present case, the (final) fastening takes place by means of a second bolt 53, which is inserted from above through the opening 49 into the rear holder 15b and an opening in the rail 5 aligned herewith and is screwed into the vehicle structure. As an alternative to beads 45, stampings and/or cams are also possible.

The rear end 13b of the spindle 13 is welded with the two bent-up areas 43 of the rear holder 15b, whereby the end 13 is accommodated between the bent-up areas 43 at least up to its area with maximum cross section. In the present case, the spindle 13 extends only up to approx. half the length of the bent-up areas 43.

Variants of rear holders 15b are described below with reference to FIGS. 13 through 17, whereby only the embodiment of the bent-up areas in connection with the mounting of the end 13b of the spindle 13 is described in detail below. The further embodiment of the rear holder 15b according to the variants corresponds to that of the above-described holder 15.

FIG. 13 shows a first variant of a rear holder 15b. Here, the bent-up areas 43 are embodied as shorter and the end 13b of the spindle 13 is placed from above and welded with the ends of the bent-up areas 43.

According to the second variant shown in FIG. 14, one bent-up area 43 is embodied corresponding to the second variant, the other bent-up area 43 is bent further inwards and welded to the spindle 13 from below.

In case of the third variant shown in FIG. 15, the bent-up area 43 bent further inwards forms the only connection to the end 13b of the spindle 13. The other part of the rear holder 15b lies flat on the rail 5.

Corresponding to the third variant, only one bent-up area 43, which is welded with the end 13b of the spindle 13, is provided in case of the fourth variant as well. In order to provide an improved contact, the end 13b of the spindle 13 is flattened from one side.

According to the fourth variant as well, only one bent-up area 43 is provided, which, however, is inserted into a slot formed in the end 13b of the spindle 13 and is welded with the wall of same.

Another exemplary embodiment is described in detail below with reference to FIGS. 19 through 21. In this case, the embodiment of the holder 15a corresponds to that of the above-described first exemplary embodiment, so that reference is made to this. An essential difference is the embodiment of the rail 5, which is embodied with a bracket 5a, which protrudes into the hollow space formed by the rails 5 and 7.

In the present case, the front holder 15a is formed by a sheet metal bent component, which besides the function as a holder, also has a holding function in relation to the vehicle structure. The sheet metal bent component is produced by means of punching and bending from a metal sheet of constant thickness. In principle, however, other materials and/or ways of manufacturing are possible as well. For example, the part may also be injection-molded from fiber-reinforced plastic.

For holding the front end 13a of the spindle 13, the front holder 15a has on its front end a bent-up bracket 17, which is provided centrally with a lead-through opening 19 for the end of the spindle 13 in its rounded end area. The front end 13a of the spindle 13, which is somewhat tapered and provided with an outer thread is guided through this lead-through opening 19 and—jointly with a bracket 5a, which is dealt with in detail later—is held in the front holder 15a by means of a nut 21 screwed on from the end and tightened.

The sheet metal part which forms the front holder 15a has, besides the bent-up bracket 17, another two bent-down areas 27 mirror inverted in relation to the central longitudinal axis of the sheet metal part, between which a middle area 29 is arranged, which—as mentioned further above—is mounted from below on the underside of the first rail 5. In this case, the lower, front ends of the bent-down areas 27 protrude further than the middle area 29 and especially also the upper area of the bent-down areas 27, so that overall a hook-like shape of the bent-down areas 27 is produced.

The bracket 17 of the front holder 15a is guided from below through a slot 23 (with an expansion in the middle area for a bead 17a, increasing the stiffness, of the holder 15a, which is embodied in the transition area of the bracket 17 and of the middle area 29) in the first rail 5 fixed to the vehicle structure, i.e., the holder-rail area of connection lies, in the present case, outside the hollow space formed by the pair of rails 5, 7. In the middle area 29 of the holder 15, two openings 31, 33 are embodied in the shape of circular openings (punched-out openings or holes). In the present case, the holder 15 and rail 5 are connected by means of welding, but they may also be connected in any other way. The above-mentioned openings 31, 33 may be used, e.g., for the exact positioning of the holder on the rails for welding. With the projecting, hook-like areas of the bent-down areas 27, a correspondingly embodied area of the vehicle structure can be grasped from behind, so that the front holders 15a are part of the fixing of the first rails 5 to the vehicle structure.

In addition, the front holder 15a with its bent-up bracket 17 cooperates with said bracket 5a of the first rail 5. This bracket 5a is punched out of the bottom of the first rail, bent up in a first area 5b at an acute angle and bent up in the end area 5c in a vertical direction with regard to the rail 5. The end area 5c is—corresponding to the bracket 17 of the holder 15a—provided with a lead-through opening 5d, which is aligned with the lead-through opening 19 of the front holder 15a and is used for leading through the front end 13a of the spindle 13. The nut 21 screwed onto the front end 13a of the spindle 13 presses the two brackets 5a, 17 against one another. A bead 5e is embodied in the area of connection between the first area 5b and the rail to increase the stiffness of the bracket 5a.

According to a variant not shown in the drawing, the two areas 27 bent down from the holder 15a are omitted, so that the holder mounted from outside on the rail only protrudes downwards in the amount of a sheet thickness. The embodiment in relation to the brackets 5a, 17 remains unchanged in this case.

While specific embodiments of the invention have been described in detail to illustrate the application of the principles of the invention, it will be understood that the invention may be embodied otherwise without departing from such principles.

APPENDIX

| | List of Reference Numbers |
|---|---|
| 1 | Vehicle seat |
| 3 | Seat part |
| 5 | First rail |
| 5a | Bracket (rail) |
| 5b | First area |
| 5c | End area |
| 5d | Lead-through opening |
| 5e | Bead |
| 7 | Second rail |
| 9 | Electric motor |
| 11 | Traverse |
| 13 | Spindle |
| 13a | Front end |
| 13b | Rear end |
| 15 | Spindle holder |
| 15a | Front spindle holder |
| 15b | Rear spindle holder |
| 17 | Bracket |
| 17a | Bead |
| 19 | Lead-through opening |
| 21 | Nut |
| 23 | Slot |
| 27 | Bent-down area |
| 29 | Middle area |
| 31 | Opening |
| 33 | Opening |
| 41 | Middle area |
| 43 | Bent-up [sic - typo in original - Tr.] area |
| 45 | Bead |
| 47 | Passage |
| 49 | Opening |
| 51 | Bolt |
| 53 | Second bolt |

What is claimed is:

1. A longitudinal adjuster for a vehicle seat, the longitudinal adjuster comprising:

a spindle arranged in a hollow space formed by a pair of rails;

spindle holders, wherein each of the spindle holders is adapted to hold an end of the spindle and at least one of said spindle holders is adapted to fasten the longitudinal adjuster to a vehicle structure, one of said spindle holders being mounted on one of said rails from the outside such that a bracket of said one of said spindle holders is guided from below through a slot into said hollow space of said one of said rails and one end of said spindle is mounted on said bracket in said hollow space, wherein another one of said spindle holders is mounted inside of said hollow space on said one of said rails from a position above said one of said one of said rails and another end of said spindle is mounted on a bent-up area of said another one of said spindle holders.

2. A longitudinal adjuster in accordance with claim 1, wherein at least one of the spindle holders has a bracket, with which the at least one of the spindle holders projects into the hollow space and on which the spindle is mounted.

3. A longitudinal adjuster in accordance with claim 1, wherein at least one of the spindle holders has at least one area extending outwardly away from the rail, which has a hook-like partial area.

4. A longitudinal adjuster in accordance with claim 1, wherein at least one of the spindle holders is formed by a sheet metal bent component that has at least one bent-down area and one bent-up bracket.

5. A longitudinal adjuster in accordance with claim 1, wherein at least one of the spindle holders for connection to the end of the spindle has a lead-through opening, through which a tapered end of the spindle is guided.

6. A longitudinal adjuster in accordance with claim 1, wherein the at least one of the spindle holders is arranged on the rail from the inside and is connected by means of a bolt that is provided with a head embodied as a positioning pin.

7. A longitudinal adjuster in accordance with claim 1, wherein at least one of the spindle holders has a bent-up bracket projecting into the hollow space, and the associated rail has another bent-up bracket projecting into the hollow space that is embodied or provided on the rail, whereby the bent-up bracket and the another bent-up bracket each have an opening aligned with the opening of the other bent-up bracket through which the end of the spindle is guided.

8. A longitudinal adjuster in accordance with claim 7, wherein the another bent-up bracket is formed as one piece with the rail.

9. A longitudinal adjuster in accordance with claim 7, wherein the another bent-up bracket has a first area running at an acute angle to the rail and a second end area running at a right angle to a lengthwise extension of the rail.

10. A longitudinal adjuster in accordance with claim 7, wherein the spindle has a step, against which one of the brackets lies, and the two bent-up brackets are pressed against the step of the spindle by means of at least one nut.

11. A motor vehicle seat arrangement comprising:

a seat part;

a longitudinal adjuster connected to the seat part for longitudinal adjustment thereof, the longitudinal adjuster comprising:

a pair of rails forming a hollow space, one of said pair of rails comprising a slot;

a spindle arranged in the hollow space;

spindle holders, each of said spindle holders including a spindle holding part holding an end of said spindle, one of said spindle holders being mounted to said one of said pair of rails from a position outside of said one of said pair of rails, said spindle holding part of said one of said spindle holders extending through said slot from a position below said one of said pair of rails, wherein at least a portion of said spindle holding part of said one of said spindle holders is arranged in said hollow space, at least a portion of said one of said spindle holders being arranged outside of said one of said pair of rails, another one of said spindle holders being mounted inside said hollow space on said one of said pair of rails from a position above said one of said pair of rails, at least one of said spindle holders including a vehicle structure connecting part fastening the longitudinal adjuster to a vehicle structure.

12. An arrangement in accordance with claim 11, wherein a first spindle holder has an area extending outwardly away from the rail with a hook-like partial area cooperating with an undercut area of the vehicle structure, to hold the rail on the vehicle structure, said vehicle structure connecting part of said at least one of said spindle holders being integrally connected thereto to form a first one-piece spindle holder, said spindle holding part of another one of said spindle holders being integrally connected thereto to form a second one-piece spindle holder structural part.

13. An arrangement in accordance with claim 11, wherein a first spindle holder has a bracket, with which the first spindle holder projects into the hollow space and on which the spindle is mounted.

14. An arrangement in accordance with claim 11, wherein a first spindle holder has at least one area extending outwardly away from the rail, which has a hook-like partial area.

15. An arrangement in accordance with claim 1, wherein a first spindle holder is formed by a sheet metal bent component that has at least one bent-down area and one bent-up bracket.

16. An arrangement in accordance with claim 1, wherein a first spindle holder has a lead-through opening, through which the tapered end of the spindle is guided.

17. A longitudinal adjuster in accordance with claim 1, wherein an area of connection of at least one of the spindle holders with one of the rails lies outside of the hollow space formed by the rails, at least one of the spindle holders extends into the hollow space with a partial area, with which the at least one of the spindle holders is connected to one end of the spindle.

18. A longitudinal adjuster in accordance with claim 3, wherein said one area has an outer surface, said outer surface engaging a surface of the motor vehicle structure, each of said spindle holders having a spindle holding portion integrally connected thereto, said spindle holding portion holding said end of said spindle, said at least one of said spindle holders having a vehicle structure connection portion integrally connected thereto, wherein said vehicle structure connection portion fastens the longitudinal adjuster to the vehicle structure.

19. A longitudinal adjuster in accordance with claim 12, wherein said hook-like area has an outer surface, said outer surface engaging a surface of the undercut area of the vehicle structure.

20. A longitudinal adjuster for a vehicle seat, the longitudinal adjuster comprising:
a first rail comprising a slot, a first rail outer surface and an inner first rail surface;
a second rail, at least a portion of said second rail being arranged between said first rail said first rail and said second rail defining a hollow space;
a spindle arranged in said hollow space, said spindle having a first distal end and a second distal end;
a first spindle holder comprising a bracket comprising a first spindle holder portion, at least a portion of said bracket extending through said slot, wherein said first spindle holder portion is arranged in said hollow space, at least a portion of said first spindle holder engaging said first rail outer surface;
a second spindle holder comprising a second spindle holder portion, said second spindle holder being mounted in said hollow space, at least a portion of said second spindle holder engaging said first rail inner surface, said first spindle holder portion supporting and positioning said first distal end of said spindle, said second spindle holder portion supporting and positioning said second distal end of said spindle, at least said first spindle holder comprising a vehicle structure connection portion, said vehicle structure connection portion fixing at least said first rail to a vehicle structure.

21. A longitudinal adjuster in accordance with claim 20, wherein said vehicle structure connection portion comprises a hook-like partial area cooperating with an undercut area of the vehicle structure to hold at least said first rail on the vehicle structure, said first spindle holder portion engaging said first distal end of said spindle, said second spindle holder portion engaging said second distal end of said spindle, said first spindle holder portion and said vehicle structure connection portion being integrally connected to said first spindle holder to form a first one-piece structure, said second spindle holder portion being integrally connected to said second spindle holder to form a second one-piece structure.

22. An arrangement in accordance with claim 21, wherein said hook-like area has an outer surface, said outer surface engaging a surface of the undercut area of the vehicle structure.

23. An arrangement in accordance with claim 20, wherein said vehicle structure connection portion is located at a position below said first rail.

24. An arrangement in accordance with claim 20, wherein said first spindle holder is mounted from a position outside of said first rail and said bracket is guided from below said first rail through said slot.

* * * * *